United States Patent [19]

Poussin et al.

[11] Patent Number: 5,244,129
[45] Date of Patent: Sep. 14, 1993

[54] APPARATUS FOR FILLING A RECEPTACLE WITH A DIVIDED SOLID PRODUCT

[75] Inventors: Bernard Poussin, Carrieres sur Seine; Daniel Lumbroso, Rueil Malmaison, both of France

[73] Assignee: Institut Francais du Petrole, Rueil Malmaison, France

[21] Appl. No.: 779,791

[22] Filed: Oct. 21, 1991

[30] Foreign Application Priority Data

Oct. 22, 1990 [FR] France ................... 90 13162

[51] Int. Cl.⁵ ........................................... B65G 31/00
[52] U.S. Cl. ................................... 222/410; 239/682
[58] Field of Search ............... 222/140, 185, 410, 502, 222/504, 482, 565; 414/301; 422/219; 141/286; 239/681, 682, 687, 689

[56] References Cited

U.S. PATENT DOCUMENTS

| | | | |
|---|---|---|---|
| 4,077,541 | 3/1978 | Murray | 222/410 X |
| 4,609,153 | 9/1986 | Van Der Lely | 239/687 |
| 4,776,493 | 10/1988 | Tegel | 222/502 |
| 4,919,898 | 4/1990 | Gartside et al. | 422/219 |

FOREIGN PATENT DOCUMENTS

| | | | |
|---|---|---|---|
| 2703329 | 8/1978 | Fed. Rep. of Germany | 414/301 |
| 730989 | 6/1955 | United Kingdom | 239/687 |
| 1052203 | 12/1966 | United Kingdom | 239/687 |

Primary Examiner—Andres Kashnikow
Assistant Examiner—Philippe Derakshani
Attorney, Agent, or Firm—Millen, White, Zelano & Branigan

[57] ABSTRACT

An apparatus for filling a receptacle with a divided solid product, comprises a feeder hopper and a dispersion head. The dispersion head includes a series of parallel and coaxial plates superimposed on one another wherein the surface area of the plates diminishes from the top plate down to the bottom plate. The whole assembly is devised such that each plate includes an aperture which allows gravity feed to the plate situated immediately underneath. The lower plate may include an aperture in order to feed the center of the receptacle. The plates are rotated to permit ejection of divided solids by centrifugal force. At least one of the plates has apertures and is placed at the exit of the hopper and in front of the particle distribution plates.

8 Claims, 2 Drawing Sheets

APPARATUS FOR FILLING A RECEPTACLE WITH A DIVIDED SOLID PRODUCT

BACKGROUND OF THE INVENTION

Generally, the filling of receptacles with solid particles (granular solids) is accomplished by transfer of the solid by means of a hopper and/or a cone either manually or mechanically or by pneumatic transference.

As a general rule, it is of the utmost interest to introduce the maximum of products into a given space, as much in order to reduce the cost of storage as for other specific reasons such as, for example, to standardise storage or reduce the volume of air or gas in the container.

Everyday storage situations relate to cereals (in silos), food products intended for consumption or for livestock, agro-alimentary products, fertilisers, chemicals, granulated plastics, pharmaceutical and/or cosmetic products and any other divided solid material (grains or tablets or extruded granulate material, pills, agglomerates, crushed materials etc.). Their other field of application consists of receptacles or chemical reactors intended to be filled with solid particles such as: catalysts, absorbents, reagents, packings, sundry fillings and the like . . .

In this case, it is almost always advantageous to place the maximum of solid product inside the reactor in order to enhance the activity thereof per unit volume and therefore the efficiency and effective service life (cycle time or working life) thanks to the ability to space out the periods of plant stoppage. It is likewise important to avoid subsequent shrinkage of the divided solid, which always occurs in an inhomogeneous fashion, encouraging undesirable and preferred passages of fluid in the case of a chemical reactor.

The use of a dispersion head placed under the hopper and consisting of plates, preferably three or four plates, and fixed on a shaft driven by a motor rigid with the hopper is a known method. For example, the patent GB 2 168 330 relates to the use of a single plate provided with arcuate segments of different radii; the patent DE 2 703 329 has three discs of different diameters which rotate thanks to an endless groove which provides for feeding to the hopper; similarly, U.S. Pat. No. 4,433,707 comprises three discs of decreasing radii, the largest being that which is closest to the hopper.

The patent applications of the Applicants (FR 89/05.780 and the additions FR 89/10.287 and FR 89/13.469) also relate to the use of at least three plates of different radii but the innovation lies in a preferred form of these plates, spiralling, such that the spiral is continuous when one changes from one plate to the next.

Many other methods are also used all of which ensure a more or less homogeneous filling of the receptacles, silos or reactors.

Despite everything, the use of any one of the aforementioned methods does not make it possible homogeneously and completely to fill the various configurations of receptacles.

For example, filling small diameter receptacles remains very difficult to achieve; indeed, in cases where the rotary speed of the shaft is not very great, the bottom plate(s) cannot impart sufficient linear velocity to the particles which are spread on them for the latter to fall into the receptacle and then the plate(s) will become blocked. When the speed diminishes and reaches a sufficiently low level, the bottom plate is the first to become blocked and then the plate which is immediately above it and so on as the speed continues to drop. Therefore, filling is no longer regular and a depression forms in the center of the bed of particles inside the receptacle.

Accordingly, there is a minimum speed of rotation for a given rate of flow. Below this speed, the rate of flow is reduced in order to avoid the lower plates from becoming clogged.

This problem of the clogging of at least one lower plates also arises when filling of the receptacle is commenced.

Furthermore, as a general case, it is not possible to conform to the desirable rate of flow of filling. For example, if it is too high, the rotary speed of the shaft may need to be increased. Consequently, the distribution of particles within the body of the receptacle will be altered and there will be more particles at the periphery than in the center.

On the one hand, one and the same apparatus (based on one of the methods) does not make it possible to fill receptacles of different diameters without the dispersion head being changed.

SUMMARY OF THE INVENTION

The object of the invention is to provide an apparatus which makes it possible to render the rate of flow of filling of particles independent from the speed of rotation. Thus, the novel use of at least a special filter which is referred to as a diaphragm is placed the outlet of the hopper and in front of the particle distribution plate diaphragm through which are apertures through which the particles of divided solid matter pass. This makes it possible to modulate the effect of the rate of filling flow with the speed of rotation of the shaft.

Thus, the apparatus according to the invention is an apparatus for filing a receptacle with a divided product or divided solids which comprises a feeder hopper and a dispersion head comprising a series of plates which are substantially parallel and coaxial and which are superimposed. The surface area of the plates diminishes from the upper plate down to the lower plate, while the distance between the edge and the axis can vary for the same plate. At least one plate possibly can be provided with at least one deflector, the whole arrangement being devised so that each plate comprises at least one aperture to allow gravity feeding to the plate situated immediately beneath it. The lower plate itself can include at least one aperture in order to feed the center of the receptacle. The plates are driven with a rotary movement which allows the ejection of the divided solids by centrifugal force. The apparatus also comprises at least one diaphragm, each diaphragm wherein each diaphragm is a plate comprising at least one aperture, the diaphragm(s) being placed at the outlet of the hopper and in front of the particle distribution plates.

BRIEF DESCRIPTION OF THE DRAWINGS

Various other objects, features, and attendant advantages of the present invention will be more fully appreciated as the same becomes better understood when considered in conjunction with the accompanying drawings, in which like reference characters designate the same or similar parts throughout the several views, and wherein.

DETAILED DESCRIPTION

Figure 1:
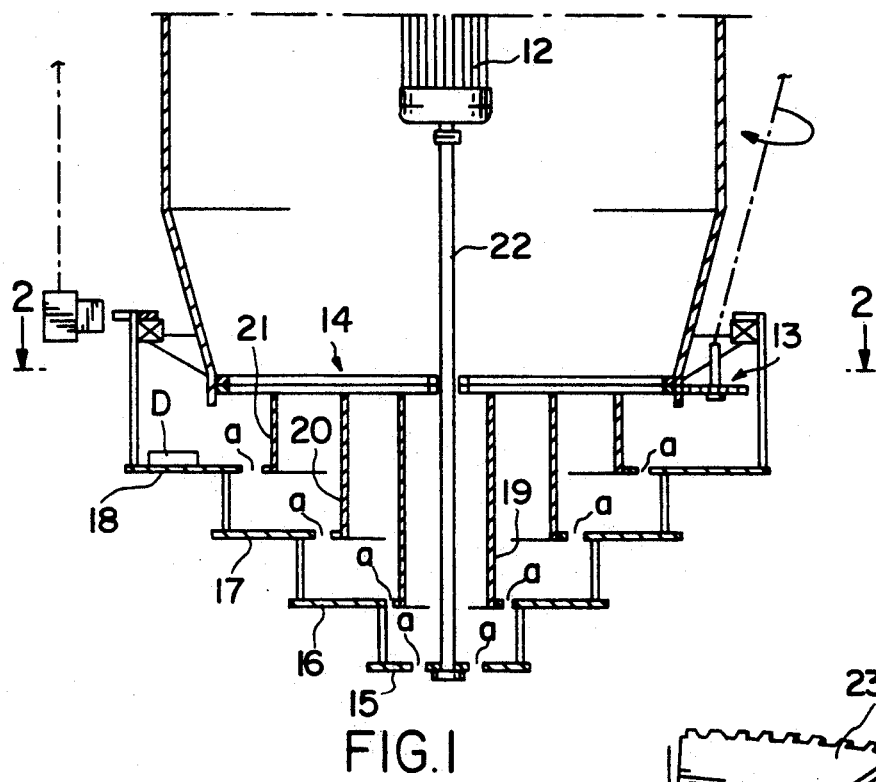
FIG. 1 is a side view in elevation showing an apparatus for separating divided solid product.

FIG. 1 shows, for example, the positioning of the diaphragm in relation to the filling apparatus in the particular case of the apparatus according to the aforementioned patent application of the Applicants; a set of plates (15, 16, 17, 18) pivot about a spindle (22) movable by virtue of a motor (12) connected to a tachometer (11); a set of concentric tubes (19, 20, 21) regulates the flow of particles; the opening of the diaphragm (14) is regulated by the device (13). The plates (15, 16, 17, 18) comprise lower middle and upper plates, respectively, with at least the upper plate (18) and middle plates (17) and (16) having apertures (a) therethrough, allowing divided solid material to flow by gravity from the upper plates to the lower plates. At least one deflector (d) is disposed on at least one of the plates such as the upper plate (18). Providing the plates with apertures and baffles is known in the art and exemplified by the aforementioned German Patent DE 27 03 329.

The invention is particularly applicable to any apparatus which proportionally covers the same surface area for each plate in order to guarantee evenness and regularity of distribution, that is, which has such a form that the ratio between the surface area which it covers for a rotary plate and the surface area which it covers for any other plate is equal to the ratio between the surface areas of the said plates (the surface area which is covered is formed by the projection on a plane at right angles to the central axis of the plate which is required to be occluded).

The invention is also applied to any solid ring which makes it possible partly to cut off the filling of at least one of the plates, that is to say a crown which covers the space bounded by the circle the radius of which is the minimum distance between the axis of rotation of the shaft which guides the plates (referred to as the central axis) and the edge of a plate (the said distance may be nil in the case of the bottom plate), and by the circle the radius of which is the maximum distance between the central axis and the edge of the said plate or the edge of a top plate (except in the case where the said plate is the top plate). More generally, the invention is applicable to any ring of a surface area greater than or equal to the surface area formed by the projection on a plane at right-angles to the central axis of the plate or plates which it is required to occlude.

The invention also applies to any combination of at least two diaphragms such as are described in the present description.

The diaphragm may be of varied shape in the case of an apparatus which proportionally covers the same surface area for each plate; generally it is a plate (a flat surface of any shape) which may be circular (that is to say a disc), and on which there is at least one aperture. FIGS. 2, 3, 4 and 5 illustrate the main types of diaphragm envisaged. They correspond to preferred embodiments but they must not be regarded as being limitative.

One of the preferred embodiments of the diaphragm is a plate of any shape (circular-i.e. a disc, or not) comprising apertures distributed in the following way; a series of N segments of such a shape that each segment is a portion of a disc, the disc has a radius smaller than or equal to the smallest distance between the edge of the top plate and the centre of the said plate and has a centre which is coincident with the central axis, each disc being of a radius different from or equal to that of the adjacent segment, the segments being disposed regularly about the central axis. The term portion of a disc is understood to mean an arc of a circle of an angle comprised between 15° and 45°. N is comprised between 2 and 20 and preferably between 2 and 5. The segments are regularly disposed about the central axis, each segment being imagined as being capable of being superposed on another segment by a rotation of an angle of a value proportional to (360/N)°. The segments may be placed in position from the outside by additions of a solid form (which may be included in the apparatus prior to the filling operation), or solid forms which are independent or otherwise from one another and the assembly of which leads to the disposition of the apertures as described hereinabove.

Figure 2:
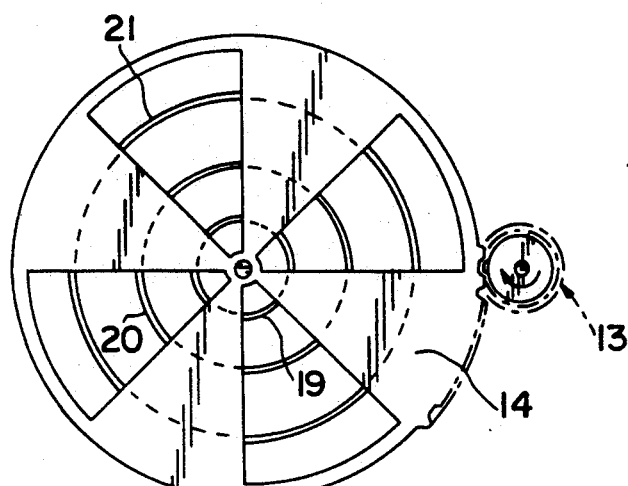
FIG. 2 is a top view showing a cross section through a diaphragm taken along line A—A.

FIG. 2 shows a cross-section through a diaphragm taken on the line A—A defined in FIG. 1; it is a plate bounding four apertures (or segments) of an arc of a circle of an angle equal to 45°.

The invention also relates to the use of at least two and for example at most eight plates having segments such as those described hereinabove, preferably at least two and at most five, disposed above one another so that some can slide in relation to the others and thus expose at least the surface area corresponding to the disc formed by taking the greatest distance between the edge of the upper plate and the central axis as a radius and centring it on the said axis; the said surface is covered in an imaginary way by projecting the series of segments onto one and the same plane perpendicular to the central axis.

Figure 3:
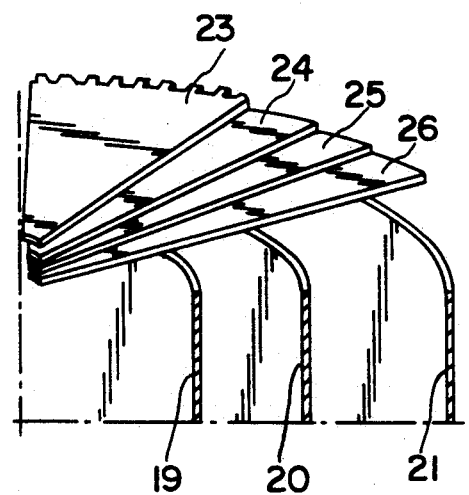
FIG. 3 is a perspective view partially in section showing an assembly of four identical plates.

FIG. 3 partially shows an assembly of four identical plates (23, 24, 25, 26) such as are defined in FIG. 2.

The total rate of flow of the apparatus comprising the assembly of segments used one above another as described hereinabove can therefore vary between 0% (in the event of the bottom part of the hopper being occluded) and 100% (if no diaphragm is present); it can be continuously regulated.

The diaphragms may also be plates, for example discs having radii greater than or equal to the greatest distance between the edge of the upper plate and the central axis, centred on the said axis, and pierced by holes disposed according to a central symmetry in relation to the central axis. The holes may be of any shape but it is preferred to adopt at least one of the following three shapes:

a small hollowed disc, an oblong shape, the said oblong shape being created as follows: two small discs of the same radius are taken, their centres at the same distance d from the central axis defining with the said axis an angle of not more than 90°; any small disc of the same radius and the centre of which is at the same distance b from the central axis and which is on the arc of a circle bounded by the centres of the preceding discs (including the said discs) may be considered and all these small discs can be hollowed out accordingly. an elliptical form, the said elliptical form being created as follows: two small discs are chosen which have the same radius and of which the centres, at the same distance d from the central axis, define with the said axis an angle of not more than 90°, so that any small disc of the same radius can be considered, where the centre is on the portion of a straight line linking the centres of the preceding discs (including the said discs), and all these small discs are then hollowed out accordingly.

Figure 4:
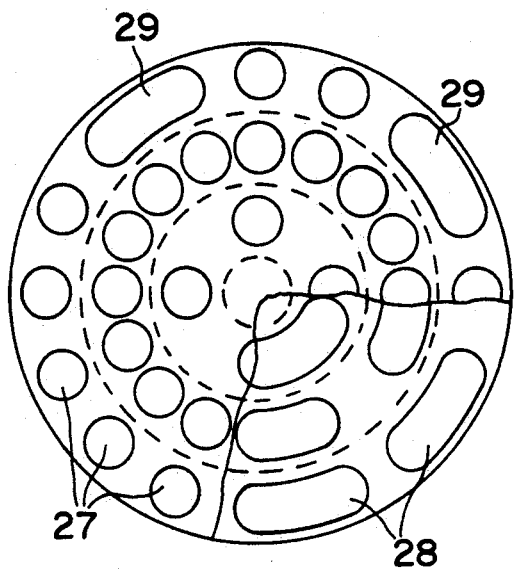
FIG. 4 is a planar view showing a diaphragm in the form of a disc illustrating both a circular hole and an oblong hole.

FIG. 4 illustrates two of these preferred forms when the diaphragm is for example a disc, in other words the circular hole (27) and the oblong shape (28).

The diaphragms are capable of undergoing temporary modifications in order to adapt the filling to a particular type of reactor without the need to change the plates.

These particular adjustments are explained hereinafter:

In the case of filling of a reactor with a central chimney, the central part of the diaphragm may be closed by the addition of a flat shape having a cross-section corresponding to that of the central chimney; this shape is generally circular (disc) and has a small hole in the center which permits the spindle but not the divided solid product to pass through the diaphragm.

Figure 5:
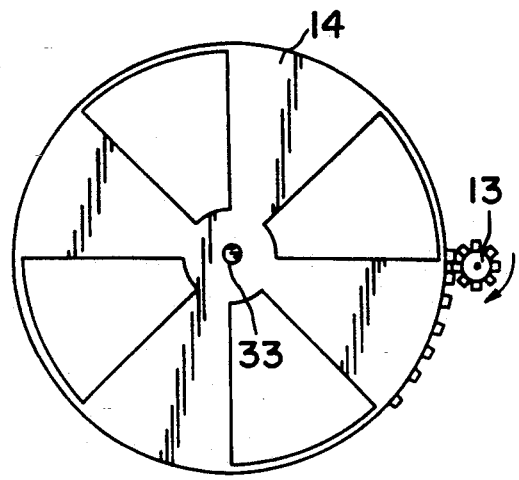
FIG. 5 is a planar view of a diaphragm used with a reactor having a central chimney.
Figure 6:
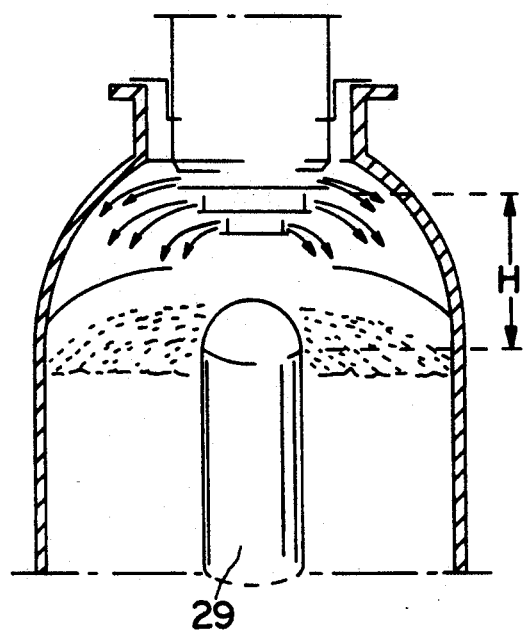
FIG. 6 is a perspective view, partially in cross section, showing a reactor with a central chimney.

FIGS. 5 and 6 illustrate an example of use of this adjustment in the case of a reactor having a central chimney (29) positioned at a central axis (33).

In the case of filling of a reactor of small diameter, it is possible to occlude a part of the diaphragm in order not to supply to all the plates; this makes it possible to fill the receptacle to a far higher level: indeed, with effect from a certain height, the speed of rotation has to be increased in order to fill the periphery of the receptacle, and then many more particles are thrown onto the said periphery, above all those which emanate from the upper plates, which has a tendency to overfeed this periphery; this can be achieved by no longer feeding the upper plate(s), that is to say firstly the plate of largest surface area, and then, if necessary, the plate situated just beneath and so on if necessary in order to be able to work in the end with just one single plate, the bottom plate, thanks to at least one ring of surface area greater than or equal to the surface formed by the projection onto a plane perpendicular to the central axis of the plate or plates which it has to occlude.

Finally, it is worth noting that the presence of at least one measuring instrument within the heart of the receptacle (a thermometric rod, a bed cooling cube or some other internal part) does no notably affect the filling of the receptacle.

The following examples make it possible to illustrate the present invention without in any way limiting its scope.

EXAMPLES

All the examples relate to the filling of reactors with the catalyst RG 482 produced by Messrs. PROCATALYSE thanks to an apparatus such as is described in the foregoing application patent of the Applicants, that is to say which comprises:
a motor rigidly connected to the hopper,
a vertical shaft driven by the motor,
a dispersion head which is caused to rotate by the said motor and which comprises four plates, a series of three fixed tubes in the form of concentric, stacked and coaxial cylinders into which the divided solids flow by gravity, each cylinder having its bottom end above a plate, all the cylinders having their top end at the same level and below the diaphragm, the diameter of each tube being less than the diameter of the tube which surmounts it and greater than the diameter of the tube which it surmounts, each plate being thus associated with a tube about which it rotates, onto the plate of which it discharges, the divided solids which fall onto this plate being subjected to a rotary movement due to rotation of the plate onto which they have fallen, the centrifugal force generated by the rotation of the plates making it possible to eject the solids at various distances from the axis of the tube.

EXAMPLE No. 1

Relationship between the rate of flow of seeds and the speed of rotation

In this example, at every filling, the speed and rate of flow have been adjusted in such a way as to ensure normal filling, that is to say a regular and homogeneous filling ensuring a virtually horizontal level of the bed of particles.

The height H is the distance between the upper plate of the apparatus and the bed of catalyst; thus, H diminishes as filling proceeds. The diameter of the reactor is shown as D.

Upon homogeneous filling of a cylindrical reactor of diameter D, the speed of rotation and the rate of flow have been measured for various percentages of opening of the diaphragm (the percentage is the ratio between the area of the apertures through which the particles are able to pass in the presence of the diaphragm and the same area when the diaphragm is absent). For every percentage, two types of diaphragm have been used: a diaphragm A comprising a plate or two superposed plates comprising segments or a disc B comprising apertures in the form of small circles (the ratio between the radius of the disc and the radius of the circles is 11).

It has been found that in either case (i.e. for each different %), the results are the same; thus, it is the percentage of opening of the diaphragm which plays a part and not the particular form of the diaphragm.

Furthermore, all the fillings of this example have been conducted by supplying all the plates, that is to say in this example no ring-shaped diaphragm was used.

a) Case of a 100% opening

The results of measurements are given in the table below (Table 1):

TABLE 1

| height H (m) | D = 1.5 m | | D = 2.5 m | | D = 3.5 m | |
|---|---|---|---|---|---|---|
| | speed (rpm) | flow (tons hr) | speed (rpm) | flow (tons hr) | speed (rpm) | flow (tons hr) |
| 6 | 50 | 5.35 | 80 | 8.00 | 110 | 7.98 |
| 4 | 55 | 6.30 | 86 | 7.97 | 117 | 7.95 |
| 2 | 70 | 8.05 | 112 | 7.98 | 147 | 8.00 |
| 1 | 95 | 8.02 | 135 | 8.05 | 195 | 8.10 |

In the case of the reactor of 1.5 m diameter, it is apparent that in order to fill the reactor in a virtually homogeneous fashion, the speed must be reduced to a level below the minimum speed below which, for a constant rate of flow, clogging occurs (calculated equal to 68 rpm), and then the rate of flow must be reduced in order to obtain an homogeneous filling. Thus, the rate of flow depends upon the speed of rotation.

b) Case of 75% opening

The diaphragm A is composed of a plate defining four segments of 45° opening.

The results of the measurements are given in the table below (Table 2):

TABLE 2

| height H (m) | D = 1.5 m | | D = 2.5 m | | D = 3.5 m | |
|---|---|---|---|---|---|---|
| | speed (rpm) | flow (tons hr) | speed (rpm) | flow (tons hr) | speed (rpm) | flow (tons hr) |
| 6 | 50 | 5.34 | 80 | 6.02 | 110 | 6.01 |
| 4 | 55 | 6.00 | 86 | 5.97 | 117 | 6.00 |
| 2 | 70 | 6.01 | 112 | 5.96 | 147 | 5.98 |
| 1 | 95 | 5.97 | 135 | 6.05 | 195 | 5.99 |

In the case of the reactor of 1.5 m diameter, it is apparent that in order to fill the reactor in a virtually homogeneous fashion, the rate of flow is still linked to the speed of rotation. According to the invention, it is then possible to reduce still further the percentage of opening.

c) Case of a 50% opening

The diaphragm A is composed of a plate defining four segments of 45° opening.

The results of the measurements are given in the table below (Table 3).

TABLE 3

| height H (m) | D = 1.5 m | | D = 2.5 m | | D = 3.5 m | |
|---|---|---|---|---|---|---|
| | speed (rpm) | flow (tons hr) | speed (rpm) | flow (tons hr) | speed (rpm) | flow (tons hr) |
| 6 | 50 | 4.01 | 80 | 3.96 | 110 | 3.95 |
| 4 | 55 | 4.05 | 86 | 4.00 | 117 | 4.02 |
| 2 | 70 | 3.98 | 112 | 4.02 | 147 | 3.95 |
| 1 | 95 | 4.00 | 135 | 3.96 | 195 | 4.00 |

For filling these three reactors, the rate of flow is independent of the speed of rotation.

d) Case of a 25% opening

The diaphragm A is composed of two plates each defining four segments of 45° of opening, the said plates being strictly superimposed and then offset by 22.5°.

The results of measurements are given in the table below (Table 4).

TABLE 4

| height H (m) | D = 1.5 m | | D = 2.5 m | | D = 3.5 m | |
|---|---|---|---|---|---|---|
| | speed (rpm) | flow (tons hr) | speed (rpm) | flow (tons hr) | speed (rpm) | flow (tons hr) |
| 6 | 60 | 1.99 | 80 | 2.04 | 110 | 2.00 |
| 4 | 55 | 1.98 | 86 | 1.95 | 117 | 2.01 |
| 2 | 70 | 2.01 | 112 | 2.00 | 147 | 1.98 |
| 1 | 95 | 1.97 | 135 | 2.02 | 195 | 2.03 |

For filling these three reactors, the rate of flow is independent of the speed of rotation.

EXAMPLE No. 2

In this example, the diaphragm takes the form of a ring in order not to supply all the plates.

According to the diameter of the reactor, so the number of plates to be supplied in order to obtain an homogeneous filling has been established.

The plates supplied by the diaphragm are either the bottom plate (in the event of only one plate being supplied), or the two lowest plates (if two plates are being supplied), or all the plates with the exception of the top plate (if there are three plates), or all four plates (if four plates are being supplied).

The results of measurements are given in the table below (Table 5).

TABLE 5

| Reactor diameter | Number of plates supplied by the diaphragm | Percentage of opening |
|---|---|---|
| From 3 to 4.5 m | 4 | 100% |
| From 2 to 3 m | 3 | 56% |
| From 1 to 2 m | 2 | 25% |
| From 0.5 to 1 m | 1 | 6% |

We claim:

1. An apparatus for filling a receptacle having a center with divided solids flowing through the apparatus at a selected rate of flow, comprising:
a feeder hopper having an outlet through which the divided solids flow at the selected rate of flow;
a motor fixed to the feeder hopper to provide a speed of rotation;
a substantially vertical shaft rotated by the motor;
a dispersion head connected to the shaft and driven by the motor, the dispersion head comprising at least an upper plate, a middle plate and a lower plate which are substantially parallel and coaxial and which are disposed one above another, the plates having surface areas which diminish progressively from the upper plate to the lower plate, at least one plate being provided with at least one deflector, at least one aperture in the upper plate and middle plate to allow gravity feeding from the upper plate to the lower plate, the lower plate including at least one aperture for feeding the divided solids to the center of the receptacle, whereby as the plates are driven with a rotary movement, the divided solids are ejected by centrifugal force;
at least two diaphragms, each diaphragm being in the form of a plate having at least one aperture, the diaphragms being placed at the outlet of the hopper above the upper plate; and
a series of at least three fixed, concentric, stacked and coaxial cylinders through which the divided solids flow by gravity, each cylinder having a bottom end positioned above a plate, all of the cylinders having upper ends substantially at the same level and below the diaphragms, the diameter of each cylinder being less than the diameter of the cylinder which surmounts it and greater than the diameter of the cylinder which it surmounts, each of the plates being thus associated with the cylinder about which the plate rotates, the lower plate turning about the shaft, whereby a part of the divided solids flow from each tube onto the plate from which it discharges, the divided solids which form on this plate being subject to a rotary movement due to the rotation of the plate on which they have fallen, the centrifugal force engendered by rotation of the plates ejecting the solids at different distances from the shaft.

2. An apparatus according to claim 1, in which at least one diaphragm includes apertures distributed in a series of N segments of such shape that each segment is a portion of a disc, the disc having a radius at least equal to the distance between a remote edge of the upper plate and the center of the upper plate, the diaphragm having a center coincident with the axis of rotation of the shaft which guides the plates, each disc being of a selected radius, the segments being disposed regularly about the shaft, each segment being superimposable on another segment by rotation through an angle of an amount proportional to $(360/N)°$, in which N is a number between 2 and 20.

3. An apparatus according to claim 2, in which between two and five diaphragms are stacked one above another to slide one in relation to the other for covering at least a surface area corresponding to a disc formed by taking the greatest distance between the edge of the upper plate and the shaft as a radius and centering it on the shaft.

4. An apparatus according to claim 1, in which at least one diaphragm is in the form of a plate covering at least the surface of a disc having a radius at least equal to the distance between the edge of the upper plate and the shaft, the disc being pierced by holes disposed according to a central symmetry in relation to the shaft.

5. An apparatus according to claim 1, wherein the receptacle is a reactor with a central chimney in which there is added to the diaphragms a planar surface having a cross section corresponding to the cross section of the central chimney.

6. An apparatus according to claim 4, in which each hole has an oblong shape, the oblong shape being created by two small overlapping holes of the same radius taken at the same distance from the shaft.

7. An apparatus according to claim 4, in which each hole has an elliptical form, the elliptical form being created by two small overlapping holes of the same radius taken at the same distance from the shaft.

8. An apparatus according to claim 4, in which each hole has the shape of a small concave hole.

* * * * *